United States Patent [19]
Shimomura et al.

[11] Patent Number: 5,479,010
[45] Date of Patent: Dec. 26, 1995

[54] PHOTOELECTRIC ENCODER HAVING A PLANE MIRROR DISPOSED PARALLEL TO THE OPTICAL AXIS OF A CONCAVE MIRROR

[75] Inventors: Toshitaka Shimomura; Tatsuhiko Matsuura, both of Kanagawa, Japan

[73] Assignee: Mitutoyo Corporation, Tokyo, Japan

[21] Appl. No.: 347,149

[22] Filed: Nov. 22, 1994

[51] Int. Cl.⁶ .................................................. G01D 5/34
[52] U.S. Cl. ................ 250/231.13; 359/727; 250/231.18
[58] Field of Search ......................... 250/231.13, 231.18, 250/230, 237 G; 359/727–730, 850, 858

[56] References Cited

U.S. PATENT DOCUMENTS

| | | | |
|---|---|---|---|
| 4,499,374 | 2/1985 | Kabaya | 250/237 G |
| 4,637,691 | 1/1987 | Uehara et al. | 359/727 |
| 4,691,101 | 9/1987 | Leonard | 290/237 G |
| 4,770,528 | 9/1988 | Imura et al. | 359/727 |
| 4,840,488 | 6/1989 | Kabaya et al. | 356/374 |
| 5,155,355 | 10/1992 | Kabaya | 250/237 G |

*Primary Examiner*—Edward P. Westin
*Assistant Examiner*—Que T. Le
*Attorney, Agent, or Firm*—Oliff & Berridge

[57] ABSTRACT

A light emitting device assembled in a light transmitting type of photoelectric encoder is required to generate light having high parallelism and large quantity of light. This device uses one half of a concave mirror having a small aberration and long focal point. Hence, light radiated from a LED disposed at the focal point of the concave mirror has high parallelism. Further, using a plane mirror disposed at the optical axis of a concave mirror, light reflected with the plane mirror from a LED onto the concave mirror travels in parallel rays. Parallel rays, having a large quantity of light resulting from overlapping parallel rays, reflected from the concave mirror directly and indirectly from the light emitting element can be obtained.

31 Claims, 11 Drawing Sheets

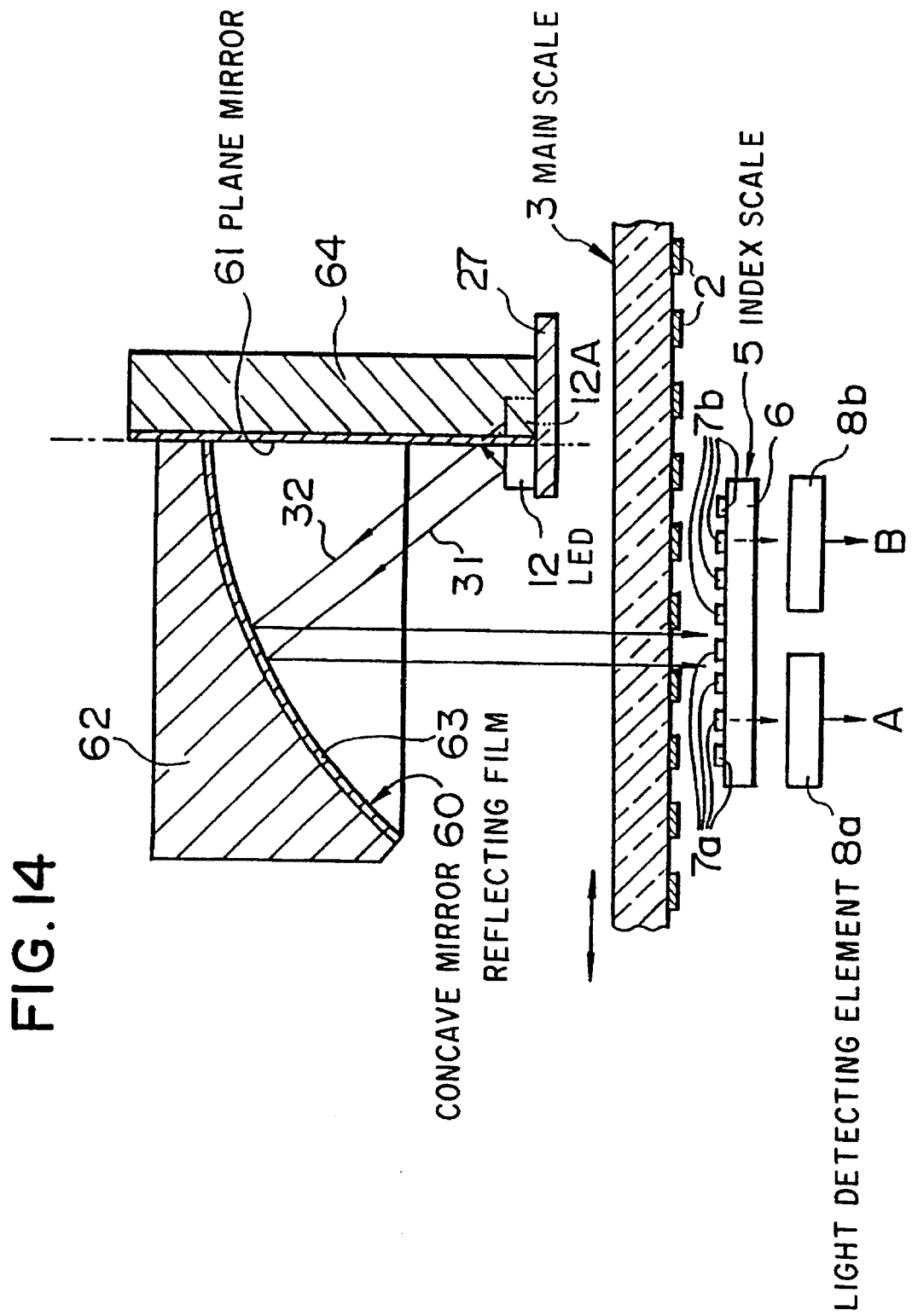

PHOTOELECTRIC ENCODER HAVING A PLANE MIRROR DISPOSED PARALLEL TO THE OPTICAL AXIS OF A CONCAVE MIRROR

BACKGROUND OF THE INVENTION

1. Field of the Invention

The present invention relates to improvements of a light emitting device assembled in a photoelectric encoder.

2. Description Of the Related Art

A photoelectric encoder functions by determining the relative change in overlap between a main scale grating and an index scale grating due to relative movement. A light source is disposed at one side of the encoder, and a light receiving element is disposed at the other side of the encoder. Through processing output signals of the light reception element, the photoelectric encoder measures a displacement quantity and detects a length and an angle of displacement.

FIG. 1 shows an example of a conventional light transmitting type of photoelectric encoder. Shown in FIG. 1, a main scale 3 includes gratings 2 to prevent light transmission under a transparent plate 1, such as a thin plate of glass or the like. A light emitting member 4 and an index scale 5 are disposed with the transparent plate 1 therebetween and are fixed as one body. Index scale 5 includes a transparent plate 6 and a plurality of gratings 7a and 7b for light shielding formed on its upper surface. Light detecting elements 8a and 8b such as photo-diodes or the like, are located under each grating 7a and 7b. A concave mirror 10 is formed on the upper surface of a block 9, made of epoxy resin, composing the light emitting member 4. At a focal point on an optical axis 11 of concave mirror 10, a light emitting diode (LED) 12 is embedded. Light rays 13 emitted upward from LED 12 are reflected with concave mirror 10 and radiate main scale 3 after becoming parallel rays. If a relative position of main scale 3 to the position of index scale 5 changes by moving toward the longitudinal direction, the strength of light passing the gratings 2 and gratings 7a and 7b is changed. Consequently, output A and B of light detecting elements 8a and 8b changes. Therefore, by processing the output, the relative position of main scale 3 with respect to index scale 5 can be measured. For a light emitting member 4 assembled in this type of photoelectric encoder, high light strength and high parallelism are desired.

Recently, there have been efforts to miniaturize, stabilize and reduce cost by assembling an index scale and a light receiving element in one body. An example of this effort is disclosed in U.S. Pat. No. 4,499,374. FIG. 2 shows an example of such a conventional photoelectric encoder, with the same reference numerals as those of the structural members in FIG. 1 used to designate the same members. A photo-diode array 15 used in the encoder of FIG. 2 comprises a plurality of photo-diodes 16a, 16b, 16c, and 16d disposed at a predetermined pitch or spacing in relation to the spacing of gratings 2 of main scale 3. Hence, this encoder can perform functions of a usual index scale and light detecting elements simultaneously. From photo-diode array 15, for example, four output signals A, $\overline{A}$, B, and $\overline{B}$, whose phases are different from each other, can be obtained. When this photo-diode array 15 is formed with photo-diodes spaced at intervals of several tens of μm on a silicon substrate, crosstalk between neighboring photo-diodes cannot be avoided. This crosstalk causes a DC component to increase and lowers a S/N ratio of signals. To reduce the crosstalk, sharp light contrast and sufficient light strength at a light receiving surface are required. For this reason, a light emitting device assembled in a photoelectric encoder using a photo-diode array is especially required to generate radiated light in high light strength and high parallelism.

To improve parallelism of radiated light, it is necessary that the size of a light source is small and that a concave mirror having a long focus length is used. However, these requirements cause the quantity of light per area of a light receiving surface to decrease. To compensate for this decrease, for example, a light receiving area of a photo-diode array can be made larger or the injection current of the LED 12 used as a light source can be made larger. Since the spacing arrangement of the photo-diodes is determined as an index scale, it is necessary to make the photo-diodes longer in the perpendicular direction, as viewed in FIG. 2, to increase the light receiving area of a photo-diode array. However, increase of the light receiving area causes a lowering of response speed of detection signals, and increase of the injection current causes an increase of heat dissipation, which are both undesirable. Further, in FIGS. 1 and 2, if a shadow is cast upon index scale 5 and photodiode array 15 because parallel rays are shielded by LED 12 and its lead-frames, the Light receiving volume will not be uniform, causing light receiving volume to lower.

SUMMARY OF THE INVENTION

A primary object of this invention is to provide a photoelectric encoder with a light emitting member for generating light rays in large quantities and high parallelism.

Another object of this invention is to provide a photoelectric encoder having a small and easily manufactured light emitting member.

A further object of this invention is to provide a photoelectric encoder with a light emitting member that satisfies the optimal conditions required by a photo-diode array.

These and other objects of this invention are attained by a light emitting member assembled in a photoelectric encoder, comprising a light emitting element, a first light reflecting member for reflecting radiated light directly entered from the light emitting element and forming it into parallel rays, and a second light reflecting member for reflecting the radiated light from the light emitting element at a flat portion in parallel to the parallel rays. The rays reflected from the flat portion then enter the first reflecting member. Accordingly, parallel rays from the second reflecting member that overlap the parallel rays created by the first reflecting member from light directly emitted from the light emitting element are formed.

BRIEF DESCRIPTION OF THE DRAWINGS

FIG. 14 is a partial cross-sectional view of the fifth embodiment.

DETAILED DESCRIPTION OF PREFERRED EMBODIMENTS

Figure 2:
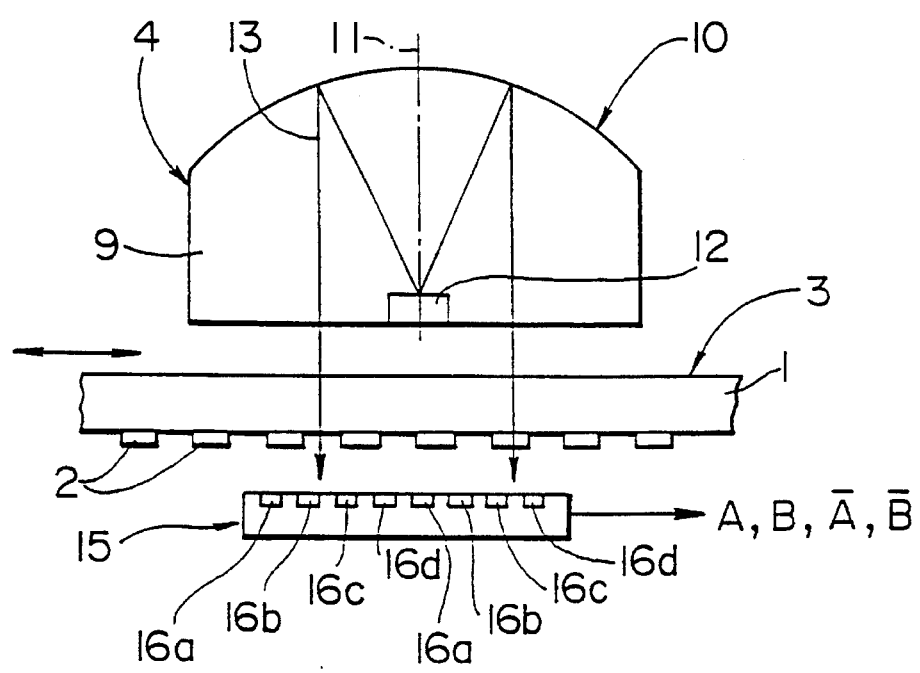
FIG. 2 is a partial schematic side view showing another example of a conventional light transmitting type of photoelectric encoder.

Referring to FIGS. 3–6, the photoelectric encoder comprises a light emitting diode (LED) 12 as a light source, a concave mirror 22 to collimate radiated light rays, referred to generally as light, 21 from LED 12, a main scale 3 radiated by the collimated light, and a photo-diode array 15 receiving light transmitted from the main scale 3. The basic structure of the encoder is similar to the structure in FIG. 2. Gratings forming alternating light transmitting portions and opaque portions are located at a predetermined pitch on each scale, the pitch being the spacing between evenly spaced items. Main scale 3 comprises transparent substrate 1 with gratings 2 disposed on a bottom side thereof at a predetermined pitch. Photo-diode array 15 comprises slim photo-diodes 16 embedded in substrate 23 at a predetermined pitch in relation to the pitch of gratings 2 of main scale 3.

Concave mirror 22 is formed through processing a part of a side surface of a block 24 formed of a light transmitting material, such as epoxy resin or the like, into a convex and partially spherical surface and coating a thin film 25 of light reflection material, such as aluminum or the like, on the surface by evaporation or a similar process. The surface of concave mirror 22 is expressed as $y=(1/4f)x^2$, on an xy plane formed with a y-axis and an x-axis perpendicular to the y-axis. The y-axis is an optical axis 26 of concave mirror 22, and "f" is a focal point on the y-axis. At the focal point of concave mirror 22 or near the focal point, a light emitting diode 12 is embedded in block 24.

At or near optical axis 26 of concave mirror 22, a plane mirror 27 is formed in parallel to optical axis 26. Plane mirror 27, similar to concave mirror 22, is formed through processing a part of a side surface of block 24 into a mirror surface and coating a thin film 28, such as aluminum or the like, on the surface. In addition, plane mirror 27 is located perpendicular to the moving direction of the main scale 3 indicated by the double-headed arrow in FIG. 6.

Figure 3:
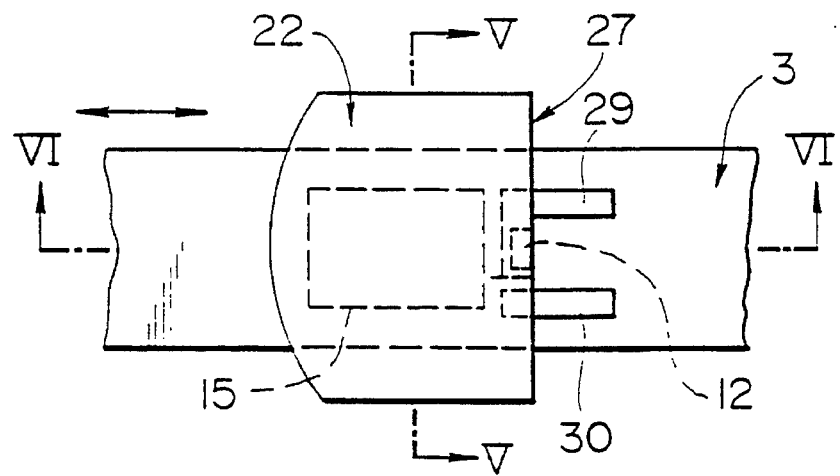
FIG. 3 is a partial top view of the first embodiment of this invention.
Figure 4:
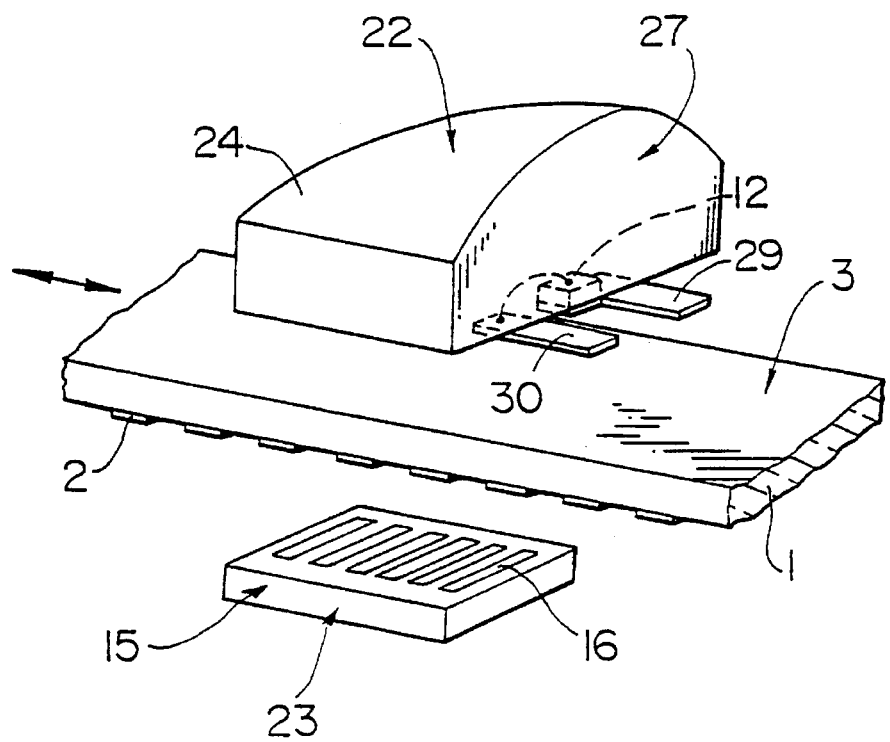
FIG. 4 is a partial perspective view of the first embodiment.
Figure 6:
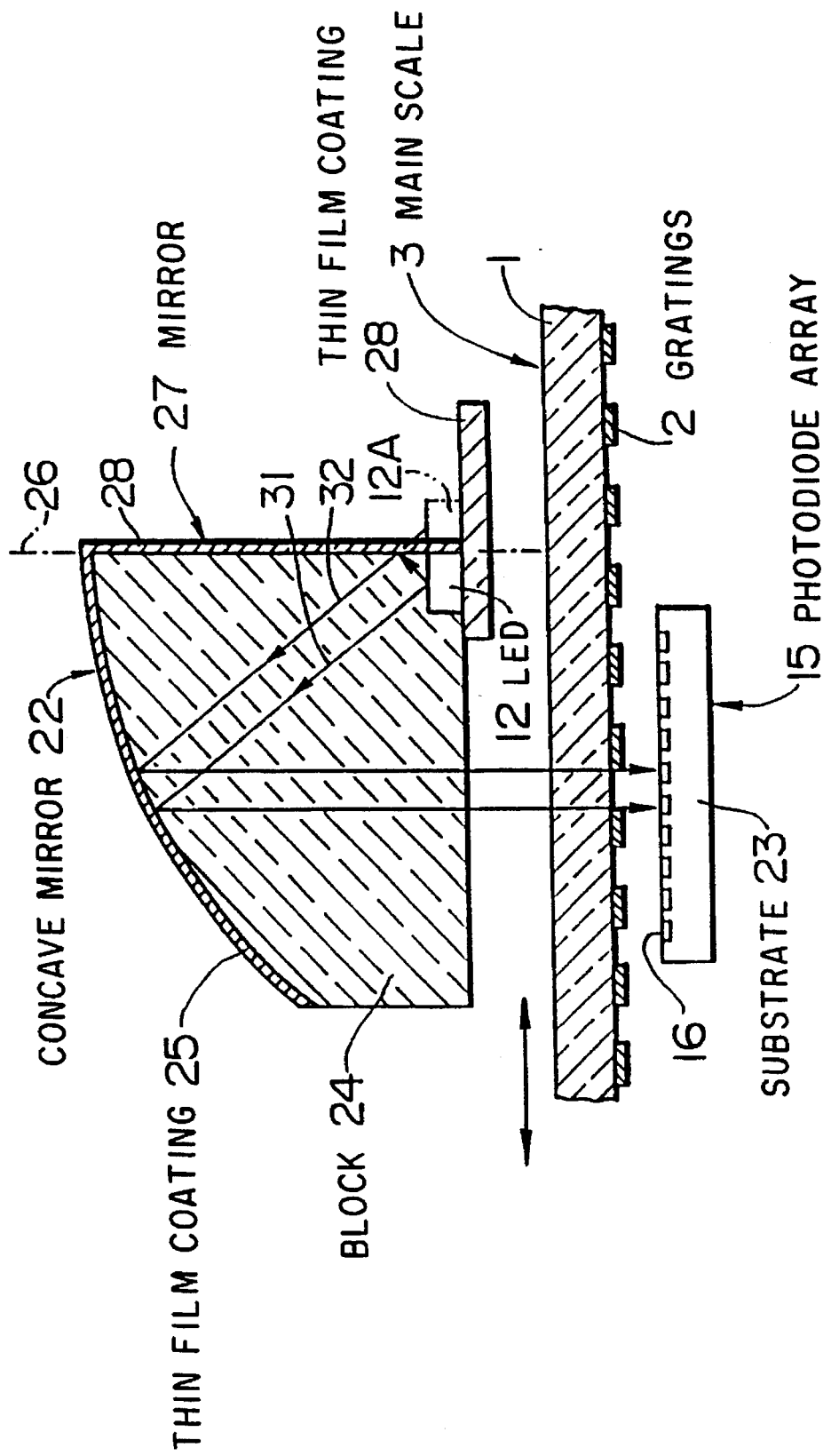
FIG. 6 is an enlarged partial cross-sectional view taken on line VI—VI in FIG. 3.
Figure 7:
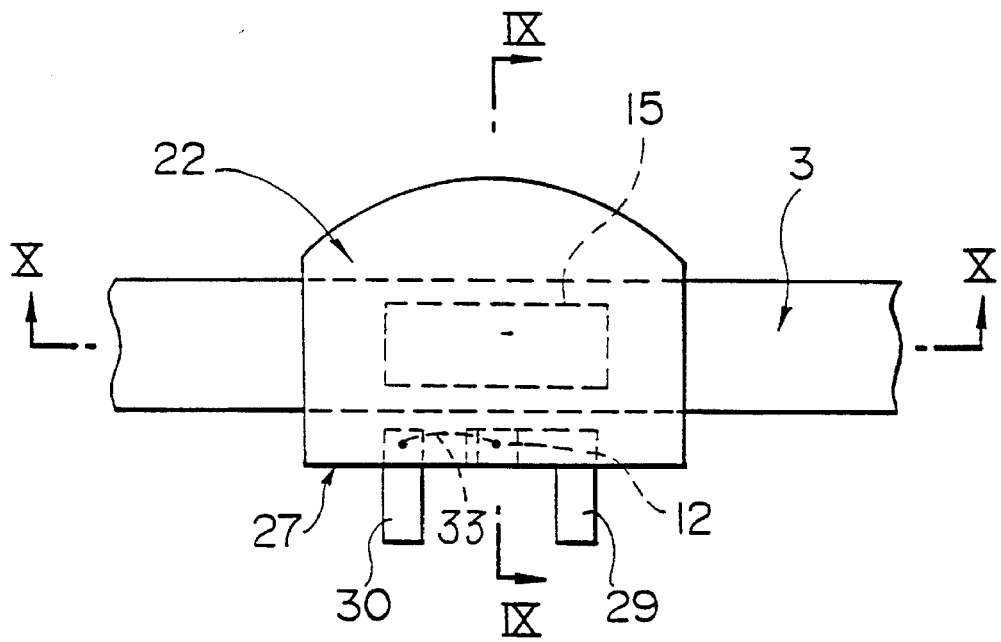
FIG. 7 is a partial top view of the second embodiment of this invention.
Figure 8:
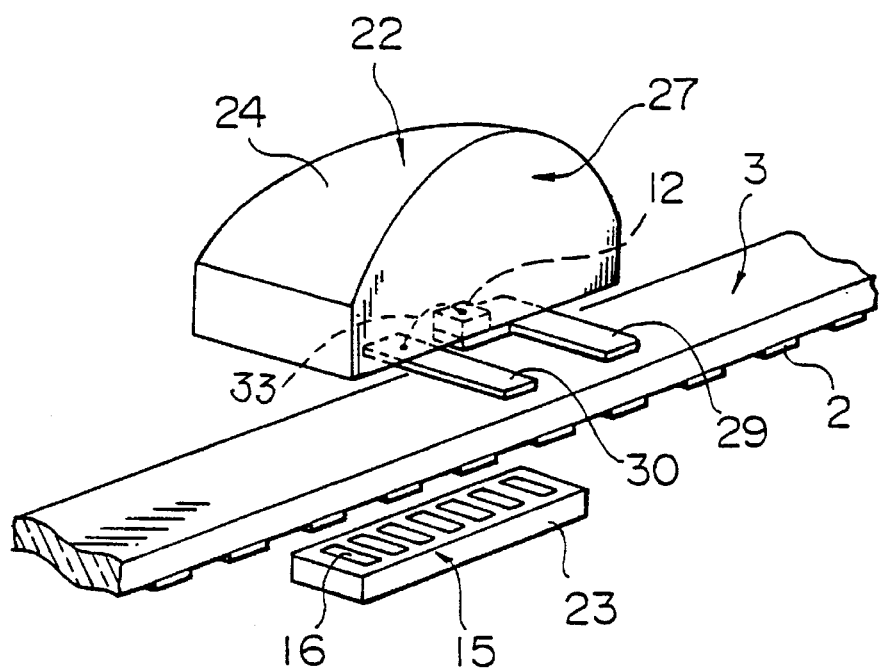
FIG. 8 is a partial perspective view of the second embodiment.
Figure 9:
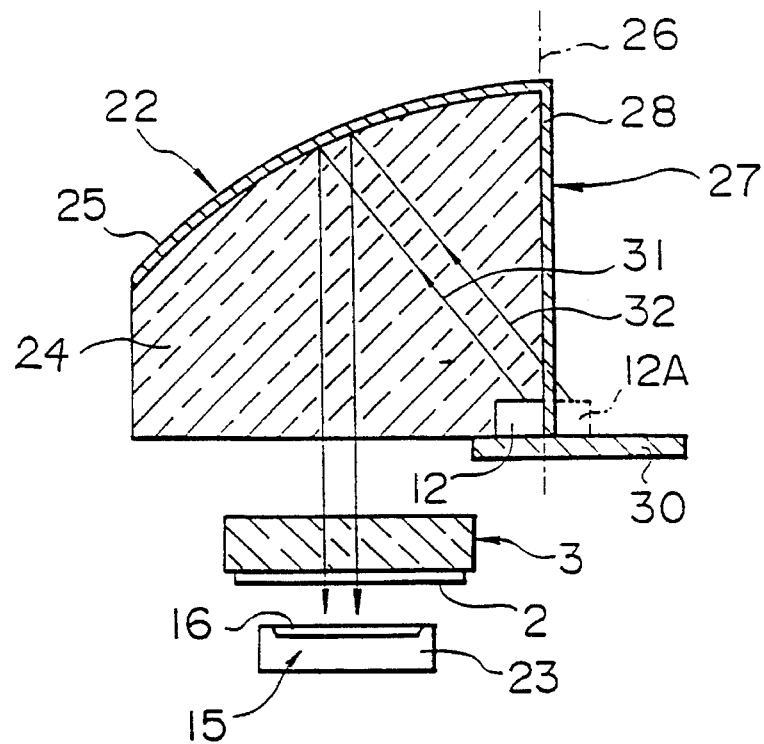
FIG. 9 is an enlarged cross-sectional view taken on line IX—IX in FIG. 7.
Figure 10:
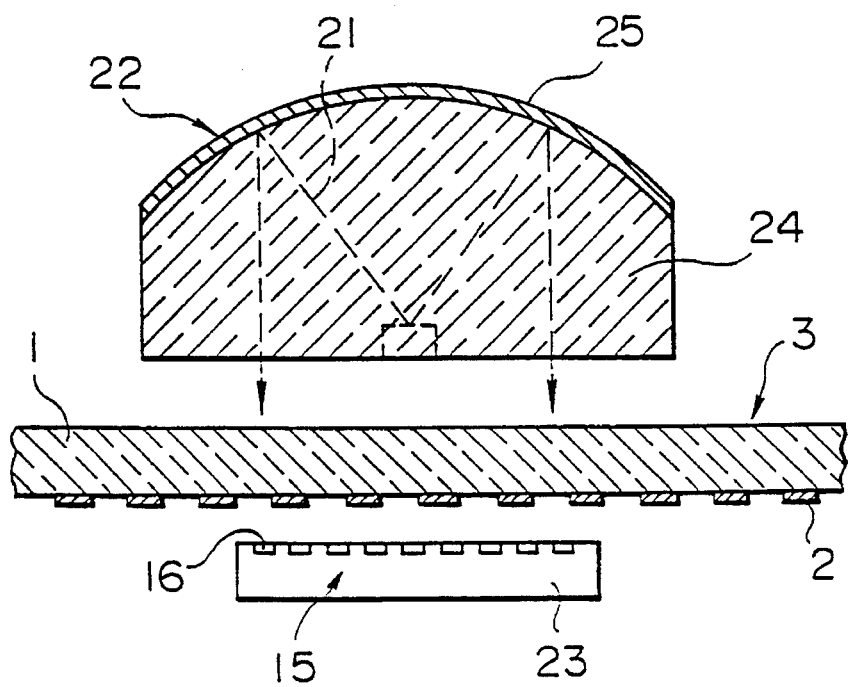
FIG. 10 is an enlarged partial cross-sectional view taken on line X—X in FIG. 7.

Light emitting diode 12 is disposed on the lowest edge of block 24 adjacent to plane mirror 27. Light emitting diode 12 is mounted on a lead-frame 29 and is electrically connected to another lead-frame 30 with thin conductors 33. As seen in FIG. 3, light emitting diode 12 is disposed above and offset from photo-diode array 15.

in the first embodiment, as seen in FIG. 6, which shows the longitudinal cross-section, collimated light paths 31 and 32 of radiated light from the light emitting diode 12 are shown. Light path 31 directly travels to concave mirror 22, and its reflected light becomes parallel rays that travel in parallel with respect to optical axis 26. On the other hand, light path 32 first travels to plane mirror 27 and is reflected from plane mirror 27 toward concave mirror 22. The reflected light in light path 32 travels as if it directly originated from a mirror image 12A of light emitting diode 12, as shown in phantom in FIG. 6.

Figure 5:
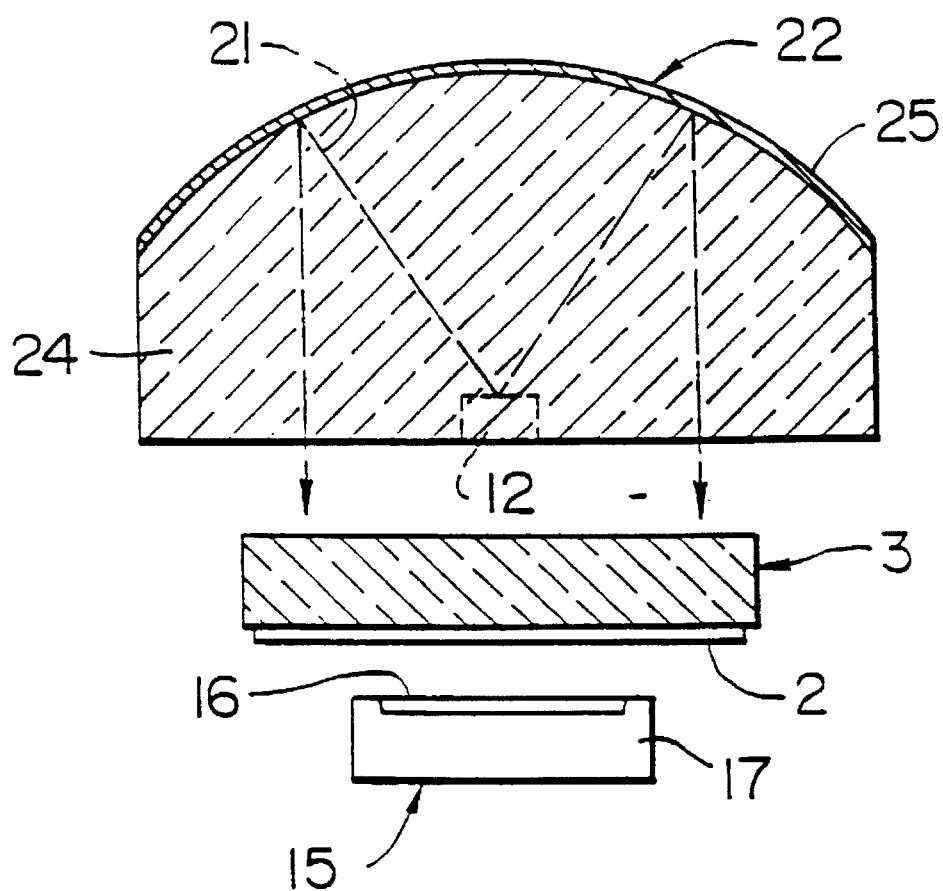
FIG. 5 is an enlarged cross-sectional view taken on line V—V in FIG. 3.

FIG. 5 shows the transverse cross-section of the photoelectric diode. Although light emitting diode 12 does not appear in this view, it is shown in phantom. Radiated light 21 from light emitting diode 12 is also collimated in this section similarly to a usual concave mirror. However, since parallelism of light is required in principle in only the longitudinal direction of main scale 3, it is not necessary to be collimated in the transverse section of FIG. 5.

Figure 1:
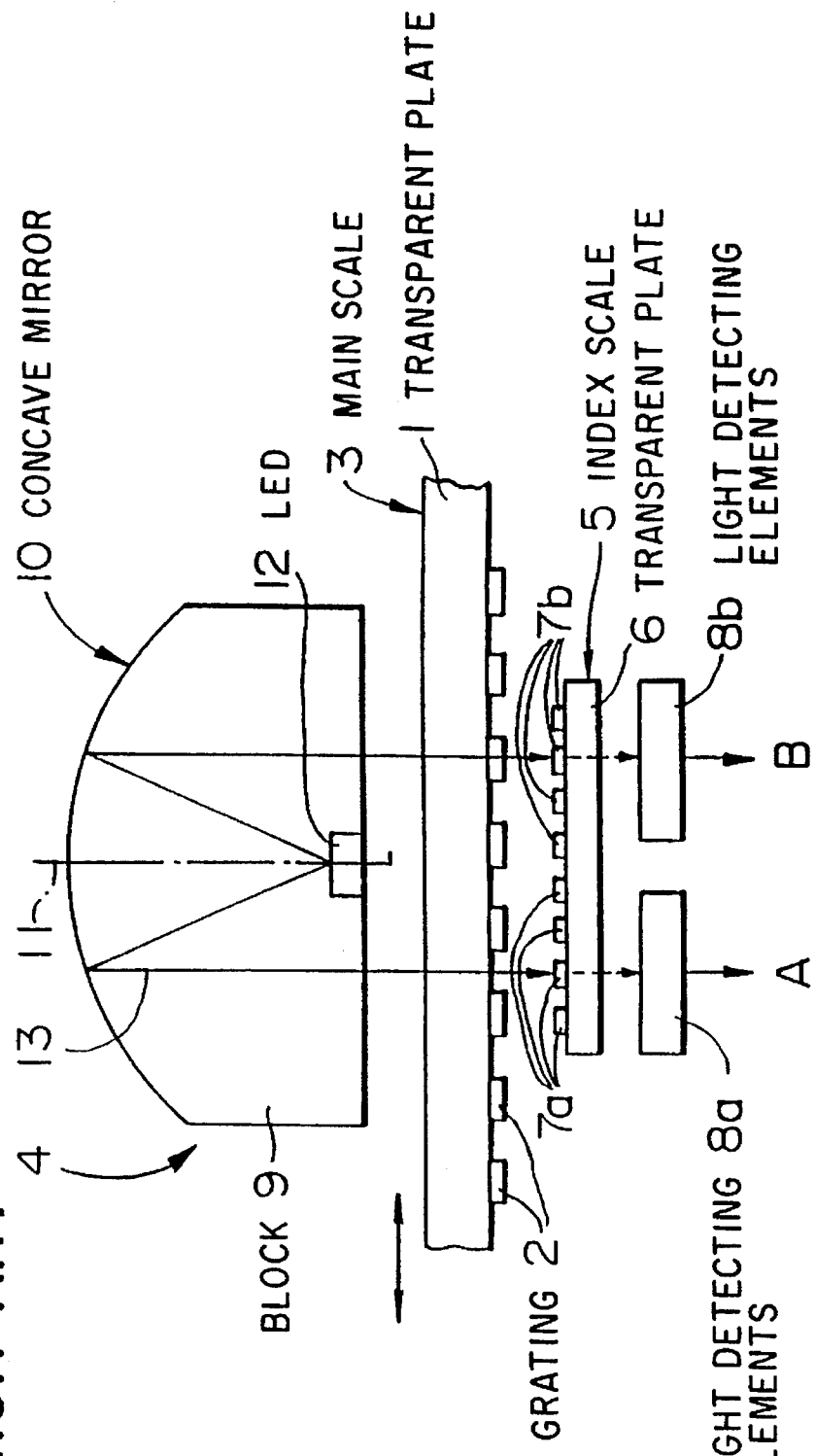
FIG. 1 is a partial schematic side view showing an example of a conventional light transmitting type of photoelectric encoder.

In the prior art device of FIG. 1, since a concave mirror 10 having about double the size necessary is used, a focal point of concave mirror 10 becomes comparatively long. Consequently, collimation quality can be increased due to smaller aberrations of concave mirror 10. Conversely, since a concave mirror with a long focal point is used, collimated light strength per area decreases.

In distinction, this invention as shown in FIGS. 3–6, uses plane mirror 27. Thus, light rays are radiated to directions where the light does not intrinsically contribute to light radiation. Therefore, it becomes possible to obtain theoretically about twice the quantity of light in comparison with no use of these rays. In this manner, since parallel rays with higher parallelism and larger quantity of light are obtained than can be obtained by conventional devices, it is possible to depress heat dissipation and extend life time of a light emitting diode through low supply power, which results from reduction of light generating volume required by the light emitting diode.

Further, if shadows of light emitting diode 12 and leadframes 19 and 30 connected to light emitting diode 12 are projected, light emitting diode 12 is disposed with eccentricity so that nonuniformity of reception quantity of light on the photo-diode array 15 does not arise.

FIGS. 7–10 are directed to the second embodiment of this invention. In the first embodiment, plane mirror 27 formed on block 24 is perpendicular to the longitudinal direction of main scale 3. In the second embodiment, plane mirror 27 is disposed in parallel to the longitudinal direction of main scale 3. The other basic structure is the same as that of the first embodiment. When using a partially spherical concave mirror, plane mirror 27 is in parallel to all of the planes including optical axis 26. Thus, even with this arrangement, the effects are the same as those in the first embodiment. In addition, in case an incident angle of incident light from light emitting diode 12 is larger than the critical angle causing a total reflection, plane mirror 27 can be omitted and replaced with a thin film coating 28 such as aluminum or the like outside block 24.

Figure 11:
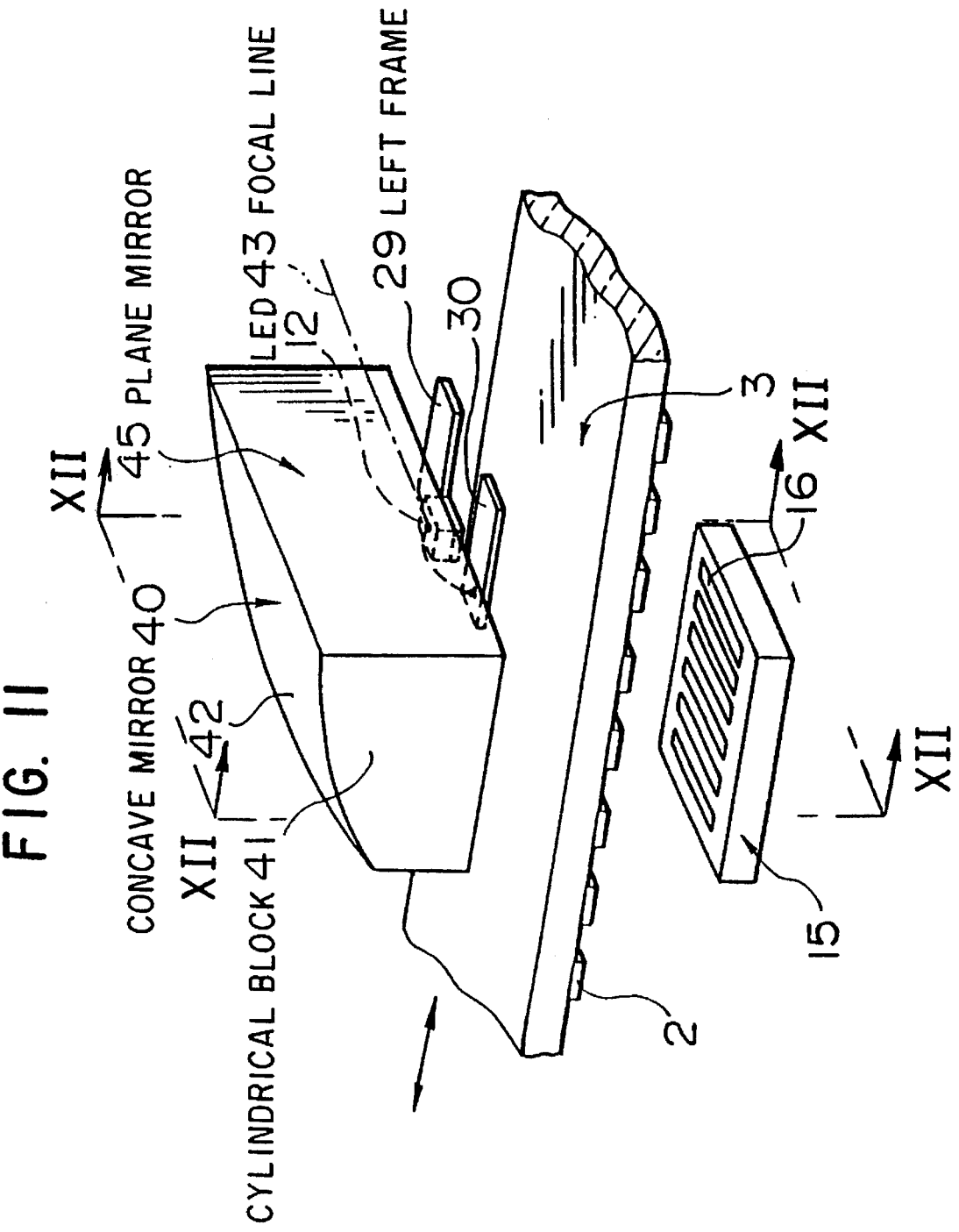
FIG. 11 is a perspective view of the third embodiment.

FIG. 11 shows a perspective view of the third embodiment using a concave mirror 40 having a partially cylindrical surface instead of partially spherical concave mirror 22 used in the first embodiment described with respect to FIG. 2 to FIG. 5. In the third embodiment, concave mirror 40 is formed by finishing the cylindrical surface of a cylindrical block 41 split into 4 pieces as a mirror surface and coating a thin aluminum film on the surface. A plane mirror 45 is formed by finishing a plane side portion including a focal line 43 of concave mirror 40 in a mirror surface, and coating a thin aluminum film on the surface.

A light path of light radiated from light emitting diode 12 embedded in block 41 near focal line 43 under plane mirror 45 is the same as that in FIG. 6, looking at it from the direction perpendicular to the longitudinal direction of main scale 3. With respect to the longitudinal direction of main scale 3, parallelism of the radiated light is maintained.

Figure 12:
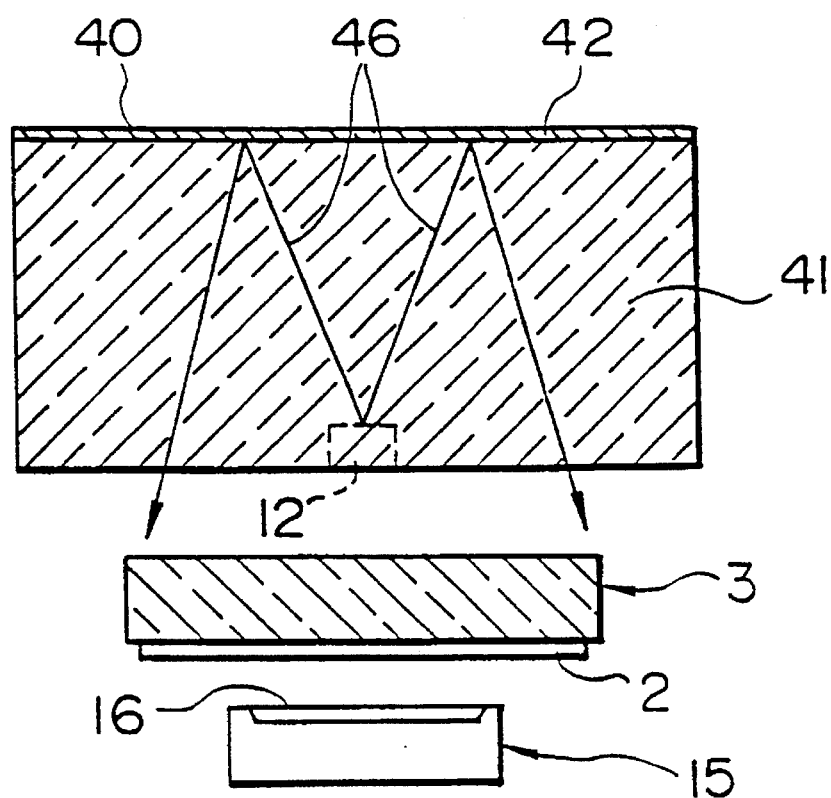
FIG. 12 is a cross-sectional view of the third embodiment taken along plane XII—XII of FIG. 11.

However, as seen in FIG. 12, a light path 46 of light radiated from light emitting diode 12 in the cross-sectional view viewed from the longitudinal direction of main scale 3 is not in parallel to the longitudinal direction of gratings 2 of main scale 3. Nevertheless, this does not affect the device's performance as an encoder.

Figure 13:
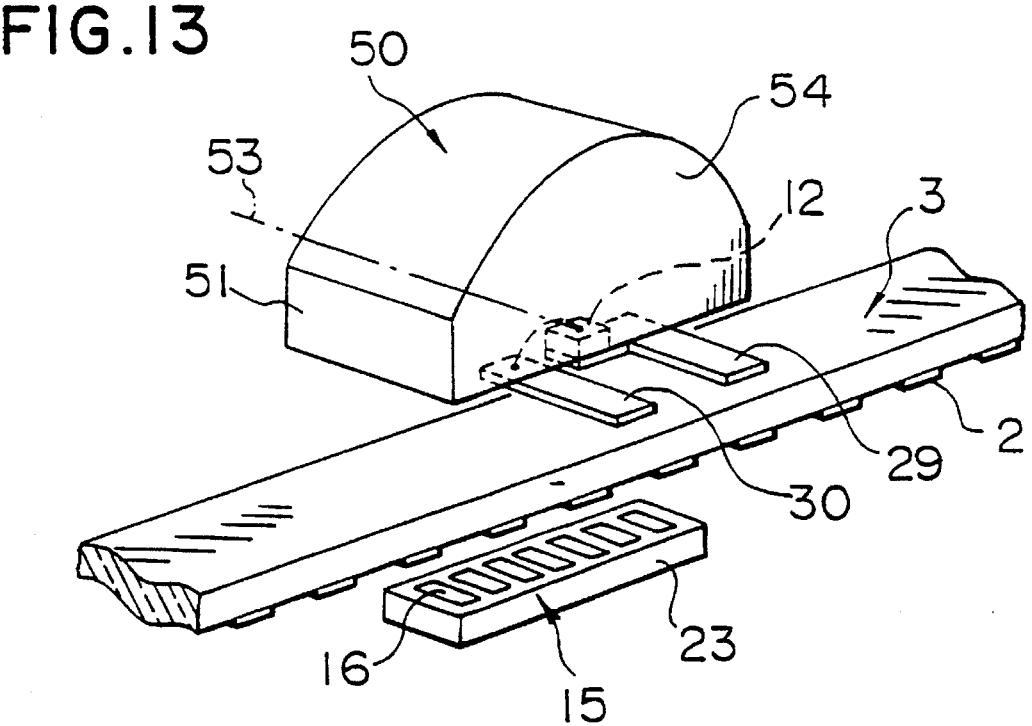
FIG. 13 is a perspective view of the fourth embodiment.

FIG. 13 shows a perspective view of the fourth embodiment using a concave mirror 50 having a partially cylindrical surface instead of the partially spherical concave mirror 10 used in the second embodiment described with respect to FIG. 7 to FIG. 10. In this embodiment, the concave mirror 50 is formed through finishing the cylindrical surface of a cylindrical block 51 split into 2 pieces in a mirror surface, and coating a thin aluminum film on the surface. A plane mirror 54 is formed through finishing a plane side portion including a focal line 53 of the concave mirror 50 in a mirror surface, and coating a thin aluminum film on the surface. Under plane mirror 54, on focal line 53, a light emitting diode 12 is embedded in block 51. A light path radiated from light emitting diode 12 is the same as that in FIG. 10, looking at it from the direction perpendicular to the longitudinal direction of main scale 3. For the longitudinal direction of main scale 3, parallelism of the radiated light is kept. However, light paths radiated from light emitting diode 12 in the cross-sectional view viewed from the longitudinal direction of main scale 3 are not in parallel. Nevertheless, since the light paths are in parallel to the longitudinal direction of gratings 2 of the main scale 3, these do not affect performance of the encoder.

FIG. 14 shows the fifth embodiment of the present invention based on the first embodiment of the present invention in a cross-sectional view along the longitudinal direction of main scale 3. This embodiment is different from the first embodiment since this is composed of a concave mirror 60 and a plane mirror 61 without using a block made of light transmitting material. Thus, concave mirror 60 is formed through coating a thin aluminum reflecting film 63 or the like on the depressed surface of a member 62 finished in a concave mirror. Plane mirror 61 is formed through coating a thin aluminum reflecting film 65 or the like on the surface of a member 64 partially finished as a plate. Since the other structure and positional relationship between an optical axis 66 of concave mirror 60 and light emitting diode 12 and the like are the same as those in the first embodiment, descriptions will be omitted. In addition, the fifth embodiment is different in that the light receiving element for the parallel rays transmitted through main scale 3 is composed of index scale 5 and a plurality of light receiving elements 8a and 8b, as used in a conventional apparatus of FIG. 1. In the fifth embodiment like this, it is apparent that effects same as those of the first embodiment can be obtained.

While advantageous embodiments have been chosen to illustrate the invention, it will be understood by those skilled in the art that various changes and modifications can be made therein without departing from the scope of the invention as defined in the appended claims.

What is claimed is:

1. A light emitting device for use with a photoelectric encoder comprising:

a light source;

a first reflecting member with a curved surface having an optical axis and being spaced from the light source that reflects light rays emitted from the light source as parallel light rays; and a second reflecting member with a planar surface positioned parallel to the optical axis that reflects light rays emitted from the light source onto the first reflecting member, wherein the light rays emitted from the light source are reflected as concentrated parallel rays of light.

2. The light emitting device of claim 1 wherein the light source is a light emitting diode.

3. The light emitting device of claim 1 further comprising a block having a surface, wherein the first reflecting member and the second reflecting member are formed on the surface of the block.

4. The light emitting device of claim 3 wherein the block is formed of light transmissive material.

5. The light emitting device of claim 4 wherein the light source is embedded in the block.

6. The light emitting device of claim 4 wherein the block has an outer convex surface spaced from the light source and an outer flat surface joining the outer convex surface and extending from adjacent the light source, wherein the first reflecting member is formed on the outer convex surface and the second reflecting member is formed on the outer flat surface.

7. The light emitting device of claim 3 wherein the first reflecting member and the second reflecting member are formed as a film of aluminum deposited on the surface of the block.

8. The light emitting device of claim 3 wherein the block is formed of epoxy resin.

9. The light emitting device of claim 3 wherein the block has an inner concave surface spaced from the light source and an inner planar surface joining the inner concave surface, wherein the first reflecting member is formed on the inner concave surface and the second reflecting member is formed on the inner planar surface.

10. The light emitting device of claim 1 wherein the first reflecting member is a concave mirror having a focal point.

11. The light emitting device of claim 10 wherein the light source is disposed near the focal point.

12. The light emitting device of claim 1 wherein the first reflecting member has a partially spherical shape.

13. The light emitting device of claim 1 wherein the first reflecting member has a partially conical shape.

14. A photoelectric encoder assembly comprising:

a light emitting device that emits concentrated parallel rays of light, including a light source, a first reflecting member with a curved surface having an optical axis and being spaced from the light source that reflects light rays emitted from the light source as parallel light rays, and a second reflecting member with a planar surface positioned parallel to the optical axis that reflects light rays emitted from the light source onto the first reflecting member;

a main scale including a light transmissive plate having a longitudinal axis and a plurality of opaque gratings spaced along the longitudinal axis, the main scale being disposed adjacent the light emitting device to receive the reflected light rays from the light emitting device and being movable with respect to the light emitting device; and an index scale including a light transmissive plate having a longitudinal axis and a plurality of opaque gratings spaced along the longitudinal axis, the index scale disposed adjacent to and aligned with the main scale to receive the reflected light rays from the light emitting device that have passed through the main scale, wherein the index scale is fixed with respect to the light emitting device such that displacement of an object is detected based on relative movement between the main scale and the index scale.

15. The photoelectric encoder assembly of claim 14 further comprising a light receiving element disposed adjacent the index scale to receive the reflected light rays that have passed through the index scale via the light emitting device and the main scale and to output a signal based on relative movement between the main scale and the index scale.

16. The photoelectric encoder assembly of claim 14 wherein the spaced opaque gratings on the index scale are photo-diodes.

17. The photoelectric encoder assembly of claim 14 wherein the light source is disposed at a position laterally offset from the longitudinal axis of the main scale and the index scale.

18. The photoelectric encoder assembly of claim 14 wherein the light source is a light emitting diode.

19. The photoelectric encoder assembly of claim 14 wherein the light emitting device further comprises a block, wherein the first reflecting member and the second reflecting member are formed on the block.

20. The photoelectric encoder assembly of claim 19 wherein the block is formed of light transmissive material.

21. The photoelectric encoder assembly of claim 20 wherein the light source is embedded in the block.

22. The photoelectric encoder assembly of claim 20 wherein the block has an outer convex surface spaced from the light source and an outer flat surface joining the outer convex surface and extending from adjacent the light source, wherein the first reflecting member is formed on the outer convex surface and the second reflecting member is formed on the outer flat surface.

23. The photoelectric encoder assembly of claim 19 wherein the block is formed of epoxy resin.

24. The photoelectric encoder assembly of claim 19 wherein the first reflecting member and the second reflecting member are formed by a film of aluminum on the block.

25. The photoelectric encoder assembly of claim 19 wherein the block has an inner concave surface spaced from the light source and an inner flat surface joining the inner concave surface and extending from adjacent the light source, wherein the first reflecting member is formed on the inner concave surface and the second reflecting member is formed on the inner flat surface.

26. The photoelectric encoder assembly of claim 14 wherein the first reflecting member is a concave mirror with a focal point.

27. The photoelectric encoder assembly of claim 26 wherein the light source is located near the focal point of the concave mirror.

28. The photoelectric encoder assembly of claim 14 wherein the first reflecting member has a partially spherical shape.

29. The photoelectric encoder assembly of claim 14 wherein the first reflecting member has a partially conical shape.

30. The photoelectric encoder assembly of claim 14 wherein the planar surface of the second reflecting member is positioned parallel to the longitudinal axis.

31. The photoelectric encoder assembly of claim 14 wherein the planar surface of the second reflecting member is positioned perpendicular to the longitudinal axis.

* * * * *

UNITED STATES PATENT AND TRADEMARK OFFICE
CERTIFICATE OF CORRECTION

PATENT NO. : 5,479,010
DATED : December 26, 1995
INVENTOR(S) : Toshitaka SHIMOMURA and Tatsuhiko MATSUURA It is certified that error appears in the above-indentified patent and that said Letters Patent is hereby corrected as shown below:

On the title page, item:

--[30]   Foreign Application Priority Data

Nov. 26, 1993  [JP] Japan .......... 5-321050--

Signed and Sealed this

Twenty-sixth Day of March, 1996

Attest:

BRUCE LEHMAN

Attesting Officer    Commissioner of Patents and Trademarks